Patented Jan. 24, 1939

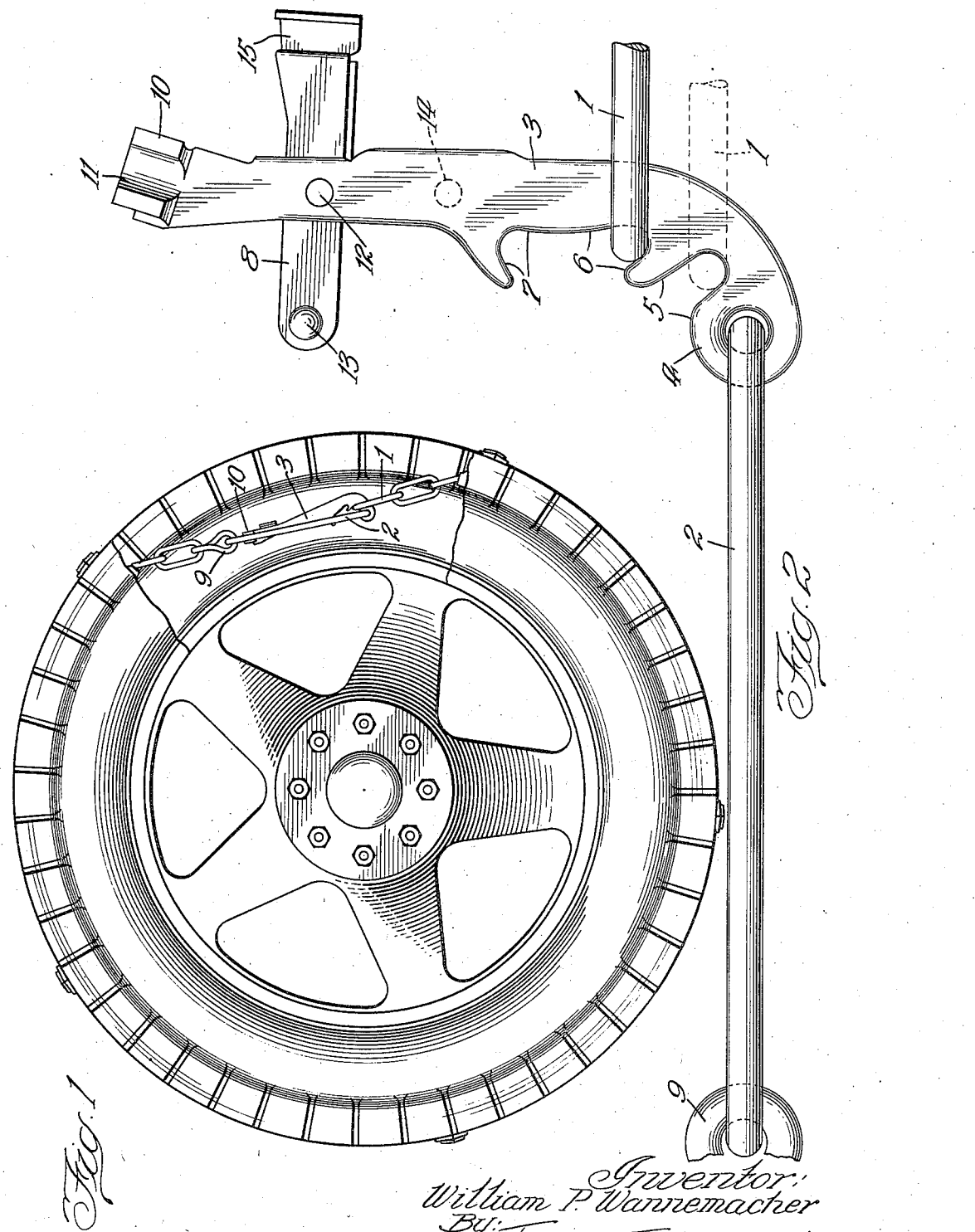

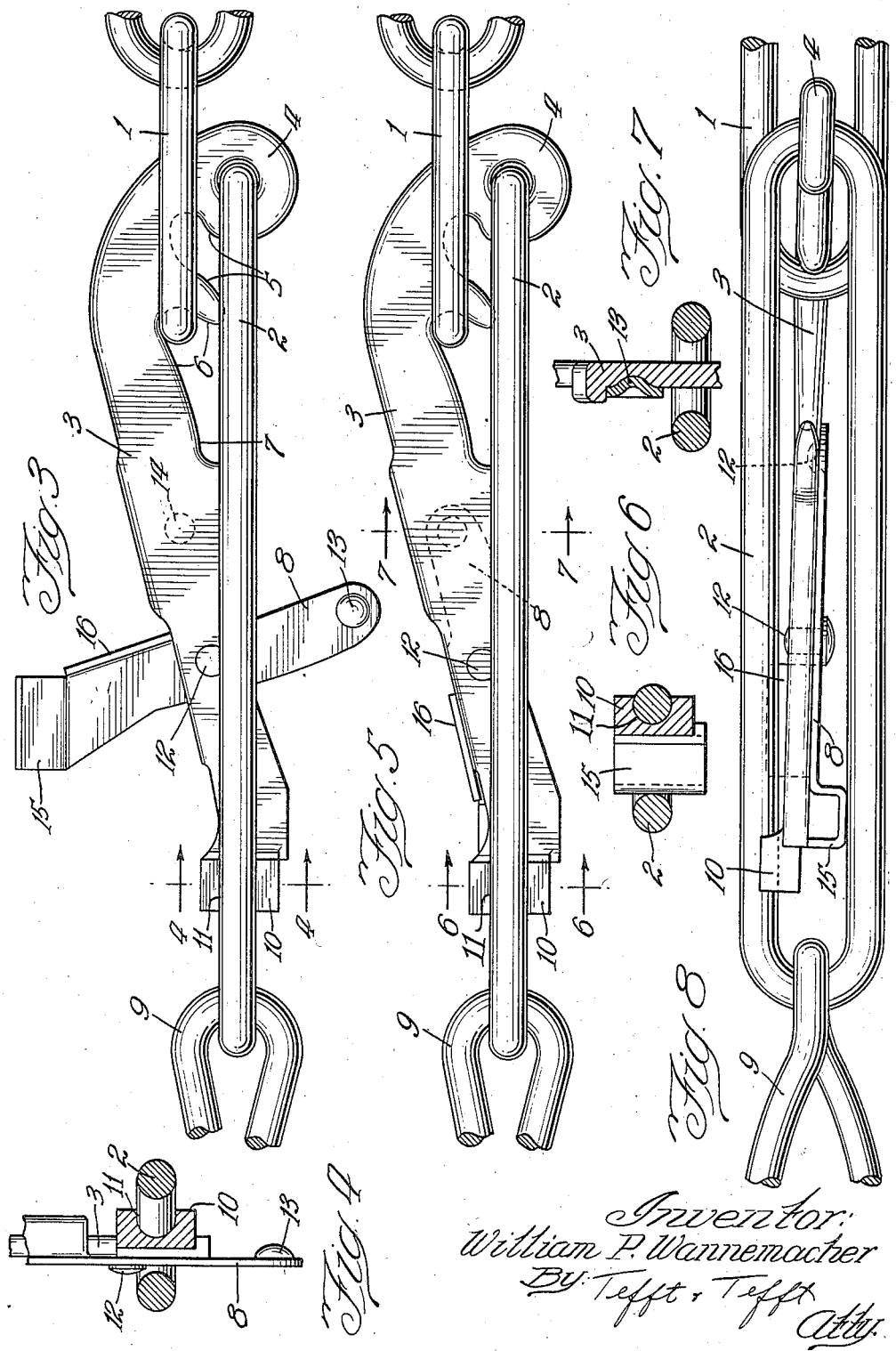

2,145,145

UNITED STATES PATENT OFFICE 2,145,145

CHAIN TENSIONING MECHANISM

William P. Wannemacher, Minneapolis, Minn.

Application December 4, 1937, Serial No. 178,141

10 Claims. (Cl. 24—70)

The present invention relates to means for placing chains, cables, cords and the like under tension by means that are very compact and occupy minimum space and which, when in tensioning position, are held very effectively against release from said position responsively to the tension imparted thereby.

A specific object of the invention is to provide a lever mechanism for effecting tensioning of a chain or the like which is engaged at one end with one end or part of the element which is to be placed under tension and at a point between its ends with the other of said parts or elements, and wherein the engagement of the lever with the said several parts is maintained by means of a manually operable device constituting what may be termed a locking or latching element, the latter being preferably carried by the lever but being capable of being otherwise secured for the performance of its particular function.

A suitable embodiment of the invention is illustrated in the accompanying drawings wherein:—

Fig. 1 is a side elevation of a wheel equipped with an articulate traction shoe structure connected with tensioning mechanism constructed in accordance with the invention, one of the wheel rims being broken away to disclose said mechanism;

Fig. 2 is a side elevation of the mechanism connected with terminal links of a chain or similar element to be placed under tension, said mechanism being shown in released or non-tensioning position.

Fig. 3 is a view similar to Fig. 2 showing the lever of the mechanism in its tensioning position with the latch member for maintaining the same in said position disposed in its inoperative position;

Fig. 4 is a fragmentary detail cross sectional view taken on the line 4—4 of Fig. 3;

Fig. 5 is a view similar to Fig. 3 showing the latch element in its lever locking position;

Figs. 6 and 7 are fragmentary detail cross sectional views taken on the lines 6—6 and 7—7, respectively, of Fig. 5;

Fig. 8 is a bottom plan view of the structure in the position shown in Fig. 5.

It will be understood that Fig. 1 illustrates a merely exemplary embodiment of a chain or similar device required to be placed under tension for a specific purpose, said specific purpose being incidental and generally requiring that the normal distance between the opposed terminal ends of a chain or chains, cable or cables or other similar device or devices is reduced in order to effect tensioning thereof.

Accordingly as shown in Fig. 2, the link 1 may represent the terminal end portion of a chain, cable or the like and the link 2 may represent another terminal element of such a structure or device.

The links 1 and 2 may constitute the terminals of a continuous chain or the like or they may constitute the terminals of two chains or the like which are secured at their other ends to devices required to be forcibly drawn toward each other for clamping or similar purposes.

In the preferred embodiment of the invention the lever 3 is permanently pivotally secured to the free end of the link 2 by means of the eye formation 4, but, obviously, said eye formation may be of a form permitting said lever to be disconnected from the link 2 when not in use.

The lever is equipped adjacent said eye formation 4 with a recess or hook formation 5 which is adapted to receive and engage the link 1 through which the lever is passed.

A second similar hook or recess formation 6 is provided adjacent the formation 5 so as to provide two selective points in the lever with which the link 1 may be engaged. Opposed to the recess or hook formation 6 is a similar formation 7 which is intended and adapted to receive the link 1 when the lever is thrown back to a position wherein said link may move from the formation 6 to the formation 7 as tension is released. The particular object of the formation 7 is to protect the latch member 8 of the lever 3 from injury by a hammer blow of the link 1 under conditions of sudden release of tension of the chain due to swinging the lever 3 into tension releasing position.

The link 2 is merely exemplary of a connection between the lever 3 and a companion link or similar device 9. The latter may be an eye at the end of a cable or the like and the adjoining part of the link 2 may be an eye or hook to engage the eye 9, and similarly, the other end portion of the link 2, which engages the eye formation of the lever 4, may constitute an eye or hook formation with the intervening portion of the link 2 constituting a rod or bar. The modification above described is not believed to require special illustration because it will readily be understood by persons skilled in the art to which this invention relates.

In the embodiment illustrated, the link 2 is of ordinary chain link construction, having two side rails or bars, and which is of a length appreciably greater than that of the lever 3.

The lever 3 is equipped at its free end portion with a lateral projection 10 equipped with a recess 11 which will be opposed to one of the side rails or bars of the link 2 as the lever is moved into the position of Figs. 5 and 8 and will receive and engage said rail or bar for holding said lever engaged against accidental return movement to the position of Fig. 2 responsively to the tension of the chain or other device.

The pivotal connection of the lever 3 with the said link 2 is such as to permit said lever to be swung laterally on said pivot after said lever has been moved to the position of Fig. 3 thereby to engage one of the side rails or bars of the link 2 in the recess 11. It will be observed that when the lever is in this position the pivotal axes of the eye formation 4 and the hook or recess formation 5 are spaced from each other so that unless the lever 3 is locked against reverse movement, it will spring back into tension releasing position under the influence of tension as aforesaid.

In order to prevent the springing back of the lever as last indicated, I provide means, exemplified by the latch lever 8, for preventing lateral movement of the lever to a position to release the projection 10 thereof from engagement with the side bar of the link which is engaged by the same. In the instance illustrated the said latch lever, composed, preferably, of resilient sheet metal, is shown as being pivotally secured between its ends to the lever 3 between the ends of the latter by means of a rivet or similar device 12. Said lever 8 is equipped at one end with a substantially semispherical projection 13 which is adapted to be sprung into a recess 14 in the lever 3 for holding the said lever 8 against pivotal movement relatively to the lever 3.

At its other end portion the said lever 8 is equipped with a substantially U-shaped and relatively shallow flange 15 which is adapted to fill the free space between the outer free end portion of the lever 3 and the opposite side bar of the link 2. Obviously when said latch lever is disposed in the position shown in Figs. 5 and 6, the projection 13 will have sprung into the recess 14 of the lever and thus the said latch lever 8 will be maintained in the position wherein the projection 10 is maintained in positive engagement with the link 2 and against all possibilty of the release of the lever for return to its tensioning releasing position.

The said latch lever 8 is equipped along one edge thereof with a lateral flange 16 which acts as a stop formation that rests upon the lever 3 when said latch lever is in its tension-lever locking position as shown in Fig. 5 and as indicated also in Fig. 8, and which also constitutes a finger engageable means for throwing said lever 8 into and out of tension-lever locking position.

Obviously the part of the structure to which the latch lever 8 is pivotally secured may be other than the lever 3, the only necessity being that said latch lever may be swung into position to perform its intended function as hereinabove particularly set forth.

It will be obvious that by reason of the fact that an appreciable portion of the lever 3 is received within the link 2, that the device is extremely compact and, further, that by reason of the resilient sheet metal construction of the lever 8 and the relative arrangement of the parts, especially because of the inter-engagement of the projection 13 with the recess 14, there is very little chance for accidental throw-out of the lever 8 from its tension-lever locking position. Said latch lever therefore constitutes a safety element which is of great importance.

It will be obvious also that compactness of the mechanism is very essential in instances where it must be confined in a relatively narrow space as between twin wheels of a truck or between twin tires of a truck wheel.

It will be obvious also that if the link 2 be of the single bar type first above described, that the projection 10 of said lever would require to be positioned to engage one side of said bar and the formation of the latch-lever designed to hold the projection 10 in such engagement would then be a formation which engages the other side of said bar and which overhangs and receives the said projection 10, such modification being obvious to persons skilled in the art without special illustration thereof being required.

The invention may be further modified in its embodiments without departing from the spirit and substance particularly defined in the appended claims.

I claim:

1. A chain tensioning mechanism including a chain equipped at one end with a relatively long link having spaced apart side walls, a hand-lever pivotally secured at one end to the normally free end of said link, a formation on said lever adjacent its said end for engagement with another link of the chain, said lever being adapted to be received in part between the side walls of the first mentioned link when positioned to effect shortening of the chain, a lateral recessed projection on the normally free end of the lever adapted to engage one side wall of the first named link for retaining said lever in its chain shortening position, and a device operatively associated with the said lever and said link and movable to a position between the normally free end of the lever and the other wall of the link for preventing lateral movement of said last-named end of said lever whereby to disengage the said projection thereof from said link.

2. The combination with a chain equipped with an elongated terminal link, of a lever pivotally secured at one end to the normally free end of said link, a formation between the ends of said lever for engagement with another link of the chain, a laterally recessed projection on said lever spaced from its pivoted end portion and from said formation for engaging one side of the first named link when said lever is swung to chain-shortening position for holding said lever against reverse swing responsively to the tension of the chain, and means operatively associated with said lever and said first-named link for engaging the other side of said link and said normally free end of said lever for preventing disengagement of the said projection from said link.

3. The combination with a chain equipped with an elongated terminal link, of a lever pivotally secured at one end to the normally free end of said link, a formation between the ends of said lever for engagement with another link of the chain, a laterally recessed projection on said lever spaced from its pivoted end portion and from said formation for engaging one side of the first named link when said lever is swung to chain-shortening position for holding said lever against reverse swing responsively to the tension of the chain, and a member pivotally mounted on the lever and equipped with a formation adapted to be swung into engagement with the other side of said link and with the normally free end of the lever for preventing disengagement of said projection from said link.

4. The combination with a chain equipped with an elongated terminal link, of a lever pivotally secured at one end to the normally free end of said link, a formation between the ends of said lever for engagement with another link of the chain, a laterally recessed projection on said lever spaced from its pivoted end portion and from said formation for engaging one side of the first named link when said lever is swung to chain-shortening position for holding said lever against reverse swing responsively to the tension of the chain, and a device engageable with said link and said lever for preventing lateral movement of the lever relatively to the link and thereby disengage said projection from said link.

5. The combination with a chain as one part and a tensioning lever as another part pivotally secured at one end to a link of the chain and equipped between its ends with a formation adapted to be engaged with another link for effecting shortening of the chain when said lever is swung to lie substantially parallel with the chain, of a formation at the other end of said lever presenting a side recess adapted to engage one side of the first-named link as said lever attains the last-mentioned position, and a latching device pivotally engaged with one of said parts and equipped with a formation adapted to be engaged with both of said parts when swung to a given position for preventing disengagement of the last-mentioned formation of said lever from said link and thereby prevent the latter from swinging to tension releasing position responsively to tension on the chain.

6. The combination with a chain as one part and a tensioning lever as another part pivotally secured at one end to a link of the chain and equipped between its ends with a formation adapted to be engaged with another link for effecting shortening of the chain when said lever is swung to lie substantially parallel with the chain, of a formation at the other end of said lever presenting a side recess adapted to engage one side of the first-named link as said lever attains the last-mentioned position, and a latching device pivotally engaged with one of said parts and equipped with a formation adapted to be engaged with both of said parts when swung to a given position for preventing disengagement of the last-mentioned formation of said lever from said link and thereby prevent the latter from swinging to tension releasing position responsively to tension on the chain, and means on said lever and said latching device for yieldingly maintaining the latter in its lever latching position.

7. A mechanism for the purpose set forth comprising as one part thereof a chain with terminal links and as another part thereof a lever pivotally secured at one end to a link of the chain and equipped between its ends with a formation to engage another link of the chain, said lever being also equipped at its other end portion with a formation adapted to engage a link of the chain for when said lever is thrown to chain tensioning position for preventing back-swing of the lever responsively to chain tension, and a latching device pivotally engaged with one of said parts and equipped with a formation adapted to be engaged with both of said parts when swung to a given position for preventing disengagement of the last-mentioned formation of said lever from said link and thereby prevent the latter from swinging to tension releasing position responsively to tension on the chain.

8. A mechanism for the purpose set forth comprising as one part thereof a chain with terminal links and as another part thereof a lever latching device pivotally secured at one end to a link of the chain and equipped between its ends with a formation to engage another link of the chain, said lever being also equipped at its other end portion with a formation adapted to lockably engage a link of the chain for preventing back-swing of the lever responsively to chain tension, and means on said lever latching device for yieldingly maintaining the latter in its lever latching position.

9. A mechanism for the purpose specified comprising a chain equipped with a terminal link, a lever pivotally secured to one end of said link and equipped between its ends with a formation for engagement with another link, said first named link and said lever being of relative length to cause the other end portion of the lever to be received in said link when said lever is moved to chain tensioning position, said lever equipped at its last-named end portion with a lateral projection having a recess adapted to receive a side portion of said link, the width of said projection carrying portion of said lever being less than the width of the link to provide free space between the other side of the link and said portion of said lever, a latching device pivotally mounted on said lever between its ends and equipped with a formation for filling said free space, thereby to prevent disengagement of said link from said recess and retain the lever in said tensioning position.

10. A mechanism for the purpose specified comprising a chain equipped with a terminal link, a lever pivotally secured to one end of said link and equipped between its ends with a formation for engagement with another link, said first named link and said lever being of relative length to cause the other end portion of the lever to be received in said link when said lever is moved to chain tensioning position, said lever equipped at its last-named end portion with a lateral projection having a recess adapted to receive a side portion of said link, the width of said projection carrying portion of said lever being less than the width of the link to provide free space between the other side of the link and said portion of said lever, a latching device pivotally mounted on said lever between its ends and equipped with a formation for filling said free space, thereby to prevent disengagement of said link from said recess and retain the lever in said tensioning position, and means on said lever and said latching device for yieldingly maintaining the latter in its lever-latching position.

WILLIAM P. WANNEMACHER.